(12) United States Patent
Tsujimoto et al.

(10) Patent No.: US 8,197,146 B2
(45) Date of Patent: Jun. 12, 2012

(54) ROLLING BEARING

(75) Inventors: Takashi Tsujimoto, Iwata (JP); Rino Fukami, Iwata (JP)

(73) Assignee: NTN Corporation, Osaka (JP)

( * ) Notice: Subject to any disclaimer, the term of this patent is extended or adjusted under 35 U.S.C. 154(b) by 828 days.

(21) Appl. No.: 11/628,673

(22) PCT Filed: May 23, 2005

(86) PCT No.: PCT/JP2005/009362
§ 371 (c)(1),
(2), (4) Date: Aug. 30, 2007

(87) PCT Pub. No.: WO2006/001144
PCT Pub. Date: Jan. 5, 2006

(65) Prior Publication Data
US 2008/0260316 A1 Oct. 23, 2008

(30) Foreign Application Priority Data
Jun. 25, 2004 (JP) ................................. 2004-188686

(51) Int. Cl.
*F16C 19/00* (2006.01)
*F16C 33/34* (2006.01)
(52) U.S. Cl. ........................................ 384/450; 384/565
(58) Field of Classification Search .................. 384/420, 384/450, 492, 449, 549, 565, 569
See application file for complete search history.

(56) References Cited

U.S. PATENT DOCUMENTS

| | | | |
|---|---|---|---|
| 4,893,387 A | 1/1990 | Akamatsu et al. | |
| 5,064,298 A | * 11/1991 | Hibi et al. | 384/565 |
| 5,159,852 A | * 11/1992 | Harimoto | 74/559 |
| 5,397,188 A | * 3/1995 | Yoshizuka et al. | 384/565 |
| 5,641,038 A | 6/1997 | Akamatsu | |
| 5,885,690 A | 3/1999 | Sada | |

FOREIGN PATENT DOCUMENTS

| | | | |
|---|---|---|---|
| EP | 536602 A1 | * | 4/1993 |
| GB | 2 219 359 | | 12/1989 |
| GB | 2253014 A | * | 8/1992 |
| JP | 61-24818 | | 2/1986 |
| JP | 1-30008 | | 6/1989 |
| JP | 3-117725 | | 5/1991 |
| JP | 4-266410 | | 9/1992 |
| JP | 4-282018 | | 10/1992 |
| JP | 04282018 A | * | 10/1992 |
| JP | 6-42536 | | 2/1994 |
| JP | 2000-205284 | | 7/2000 |
| JP | 199 59 499 A1 | | 6/2001 |
| JP | 2004316533 A | * | 11/2004 |

OTHER PUBLICATIONS

Chinese Office Action issued Oct. 24, 2008 for Chinese Application No. 200580019632.1 w/translation.
Changquan Yuan, Zhihua Ding, Wenzhang Wu, "Surface Roughness and Measure", Engineering Industry Press, p. 8, Oct. 1989 w/translation.

* cited by examiner

*Primary Examiner* — Marcus Charles
(74) *Attorney, Agent, or Firm* — Wenderoth, Lind & Ponack, L.L.P.

(57) ABSTRACT

At least on a surface of a rolling element of a rolling bearing, innumerable minute concave recesses are randomly formed. An area percentage of the recesses on the surface having the recesses formed thereon is in a range from 5 to 20%, and a surface roughness parameter Rymax of the surface having the recesses formed thereon is in a range of 0.4 to 1.0.

1 Claim, 6 Drawing Sheets

ROLLING BEARING

BACKGROUND OF THE INVENTION

I. Technical Field

The present invention relates to a rolling bearing, which can be applied to, for example, a roller bearing used for a shaft supporting portion as a transmission of an automobile.

II. Description of the Related Art

JP-A-02-168021 and JP-A-06-42536 each disclose a rolling bearing in which a surface of a rolling element is provided with minute irregularities formed thereon to improve an oil film forming ability. In this conventional technique, as a countermeasure for a damage due to poor lubrication, such as a peeling damage of a roller bearing, there are provided recesses each having a minute concave shape in rolling contact surfaces of rollers and/or raceway surfaces of inner and outer races. When the surface roughness is expressed by a parameter Rqni, a value of a ratio Rqni(C)/Rqni(C) between an axial surface roughness Rqni(L) and a circumferential surface roughness Rqni(C) becomes 1.0 or less, and a parameter Sk value of the surface roughness is set to be −1.6 or less, thereby elongating a life of the rolling bearing if a mating surface is either a rough surface or a smooth-finished surface.

SUMMARY OF THE INVENTION

In recent years, there are tendencies of downsizing and increasing power output of a portion in which the rolling bearing is used such as a transmission of an automobile, and a viscosity of a lubricating oil tends to be lower. In other words, in a use environment of the rolling bearing, load and temperature are increasing. Thus, a lubrication environment has been consistently changing so as to be more severe for bearings than ever before. Abrasions or separations of a surface originating type due to lubrication failure tend to occur more easily.

Conventional minute concave recesses are formed so that when a surface roughness is expressed by the parameter Rqni, a value of a ratio Rqni(L)/Rqni(C) of an axial surface roughness Rqni(L) and a circumferential surface roughness Rqni(C) is equal to or lower than 1.0 (Rqni≧0.10), and a surface roughness parameter Sk value is equal to or lower than −1.6, thereby realizing elongated life even if a mating surface is either a rough surface or a smooth-finished surface. However, effects thereof may not be exerted when an oil film is extremely thin under conditions of low viscosity and lean lubrication.

A rolling bearing according to the present invention includes, at least on a surface of a rolling element, innumerable minute concave recesses randomly formed, and an area percentage of the recesses on the surface having the recesses formed thereon is in a range from 5 to 20%, and a surface roughness parameter Rymax of the surface having the recesses formed thereon is in a range of 0.4 to 1.0. The area percentage of the recesses means the ratio of areas of the recesses with respect to an area of an entire rolling contact surface in a case where the innumerable minute concave recesses are randomly formed on the rolling contact surface of the roller. The parameter Rymax is a maximum value of a maximum height per reference length (ISO 4287: 1997).

As is commonly known, the rolling bearing is a machine element for supporting a shaft which rotates or swings due to a rolling motion of the rolling element (ball or roller). Usually, the rolling element is interposed between a raceway of an inner race and a raceway of an outer race so as to be freely rollable. However, there is also a type having no inner race, in which an outer peripheral surface of a shaft directly serves as a raceway surface. The recesses are formed at least on the surface of the rolling element with an intention of preventing exclusion of a rolling bearing in which the minute concave recesses are also formed in a raceway surface. In a case where the rolling element is a roller, there is an intention of preventing exclusion of a rolling bearing in which the minute concave recesses are formed not only on the raceway surface but also on end surfaces.

When the surface roughness of the surface having the recesses formed thereon is indicated by the parameter Rqni, a value of a ratio "Rqni(L)/Rqni(C)" between an axial surface roughness Rqni(L) and a circumferential surface roughness Rqni(C) may be equal to or lower than 1.0. Here, the parameter Rqni is obtained by integrating a square of a height deviation from a roughness central line to a roughness curve within an interval of a measurement length and determining a square root of a mean value within the interval, and is also referred to as a root-mean-square roughness (ISO 4287: 1997). Rqni is determined from a section curve and a roughness curve that are expanded and recorded, by numerical calculation, and is measured by moving a tracer of a roughness meter in a width direction and in a circumferential direction.

According to the present invention, at least on a surface of the rolling element, the innumerable minute concave recesses are randomly formed, thereby enhancing the oil film forming ability and elongating the life of the rolling element even under the conditions in which the oil film is extremely thin under the low viscosity and lean lubrication. In particular, by setting the area percentage of the recesses to be in a range of 5 to 20% and the maximum value Rymax of the maximum height per reference length of the surface having the recesses formed thereon to be in a range from 0.4 to 1.0, it is possible to prevent an oil film shortage even under the lean lubrication, and as compared to a conventional product, it is possible to obtain a longer life even under the condition in which the oil film is extremely thin.

The above-mentioned objects and characteristic points according to the present invention will be more apparent from descriptions made below with reference to the attached drawings.

DETAILED DESCRIPTION OF THE INVENTION

Figure 1:
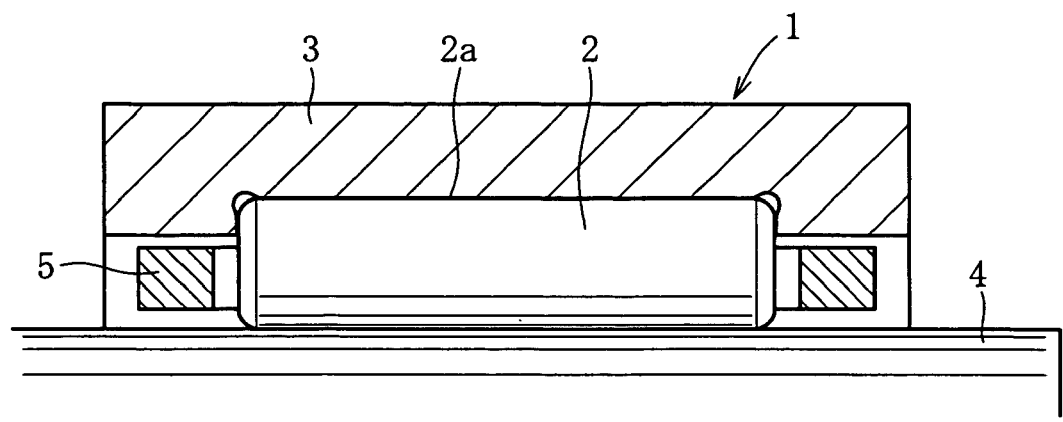
FIG. 1 is a sectional view of a needle roller bearing.

A rolling bearing includes an inner race, an outer race, and a rolling element as main components thereof. In at least one of a rolling surface and end surfaces of the rolling element and raceway surfaces of the inner and outer races (and a cone back face rib surface in a case of an inner race of a tapered roller bearing), innumerable minute concave recesses are formed randomly, thereby obtaining a fine rough surface. In the fine rough surface, an area percentage of the recesses is in a range from 5 to 20%, and a surface roughness parameter Rymax of a surface in which the recesses are formed is in a range from 0.4 to 1.0. As described above, by setting the area percentage of the recesses to be in a range from 5 to 20%, and a surface roughness parameter Rymax of a surface in which the recesses are formed to be in a range from 0.4 to 1.0, it is possible to exhibit a high oil film forming effect even under the conditions in which an oil film is extremely thin, and to obtain a sufficient long life effect even under an extremely severe lubrication condition in which an oil film parameter $\Lambda=0.13$. Further, when a surface roughness of each surface is determined in each of an axial direction and a circumferential direction and is indicated by a parameter Rqni, a value of a ratio Rqni(L)/Rqni(C) between an axial surface roughness Rqni(L) and a circumferential surface roughness Rqni(C) is equal to or lower than 1.0. As a surface working processing for obtaining such a fine rough surface, special barrel finishing can be performed so as to obtain a predetermined finished surface, but a shot or the like may be used.

A measuring method and conditions for the parameters Ryni, Rymax, Sk, and Rqni are explained with examples as follows. Note that, when surface properties expressed by those parameters are determined with respect to components such as rolling elements and a bearing ring of a rolling bearing, even a value obtained by performing measurement at one position is reliable enough as a representative value, but it is preferable to perform the measurement at two positions, for example, opposing each other in a diameter direction.
Parameter calculation standard: JIS B 0601: 1994 (surfcom JIS 1994)
Cutoff type: Gaussian
Measurement length: $5\lambda$
Cutoff wavelength: 0.25 mm
Measurement magnification: ×10000
Measurement speed: 0.30 mm/s
Measurement position: Roller center
The number of measurement: 2
Measuring apparatus: Surface roughness measuring device surfcom 1400 A (TOKYO SEIMITSU CO., LTD.)

With regard to the minute concave recesses provided in a rolling contact surface of a roller, when an area percentage of the recesses with respect to the entire rolling contact surface falls in a range of 5 to 20%, an average area of the recesses falls in a range of 30 to 100 $\mu m^2$ while being summed up except for recesses each having an equivalent circular diameter of 3 $\mu m\Phi$ or less. When Rymax of the recesses is outside a range of 0.4 to 1.0 $\mu m$, the area percentage of the recesses with respect to the rolling contact surface is more than 20%, and the average area of the recesses is more than 100 $\mu m^2$, an effective length of contact tends to be reduced, and an effect of a long life tends to be reduced.

In performing quantitative measurement of the recesses, from an image obtained by enlarging the surface of the roller, it is possible to perform quantification using a commercially available image analysis system. Further, use of a surface property testing method and a surface property testing device according to JP-A-2001-183124 allow a stable and accurate measurement. Analysis is performed assuming that flat portions of the surface are indicated as white portions and the minute recesses are indicated as black portions in the image.

Measurement conditions are described as follows. Further, when the area and the average area of the recesses are measured with respect to the components such as the rolling elements and the raceway surface of the rolling bearing, even a value obtained by performing measurement at one position is reliable enough as a representative value, but it is preferable to perform the measurement, for example, at two positions.
Area percentage: Ratio of areas occupied by picture elements (black portions) in an observing sight range, which is smaller than a binarization threshold value ((brightness of a light portion+brightness of a dark portion)/2)
Average area: Sum of areas of black portions/total amount
Measurement sight: 826 $\mu m \times 620$ $\mu m$ (desirably 413 $\mu m \times 310$ $\mu m$ when a diameter of the roller is less than $\Phi 4$)
Measurement position: Roller center
The number of measurement: 2

Figure 2:
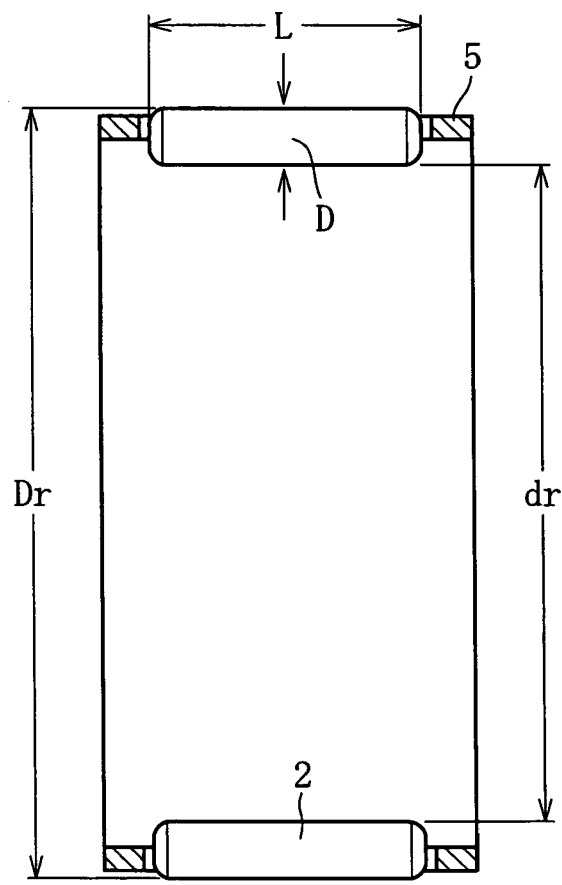
FIG. 2 is a sectional view of a needle roller bearing used for a life test.
Figure 3:
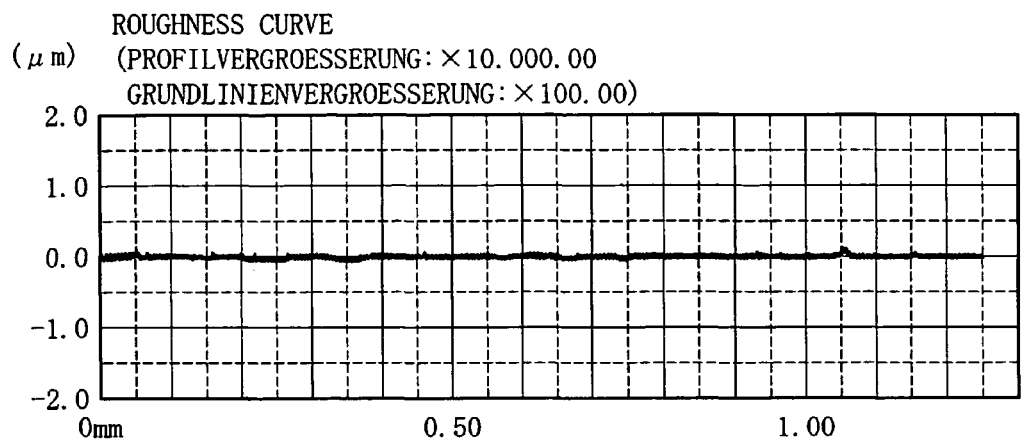
FIG. 3 is a graph of a roughness curve showing a state of a finished surface of a rolling element of a test bearing.
Figure 4:
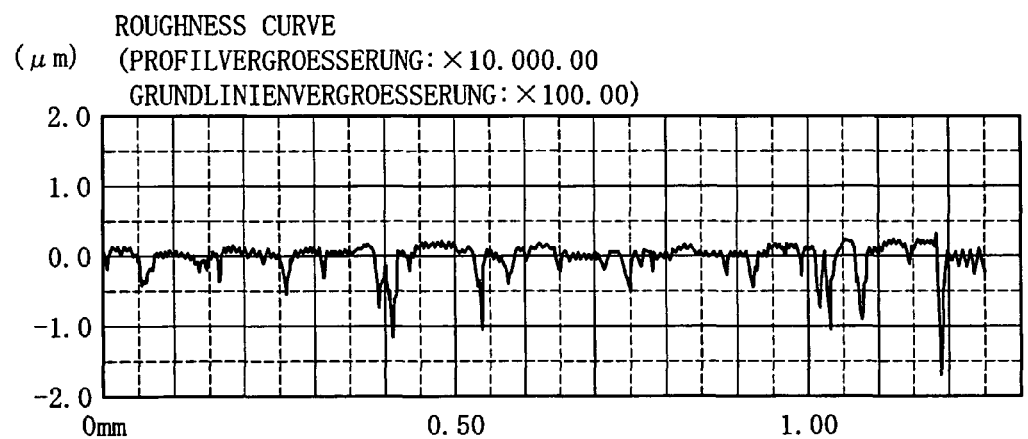
FIG. 4 is a graph of a roughness curve showing a state of a finished surface of a rolling element of a test bearing.
Figure 5:
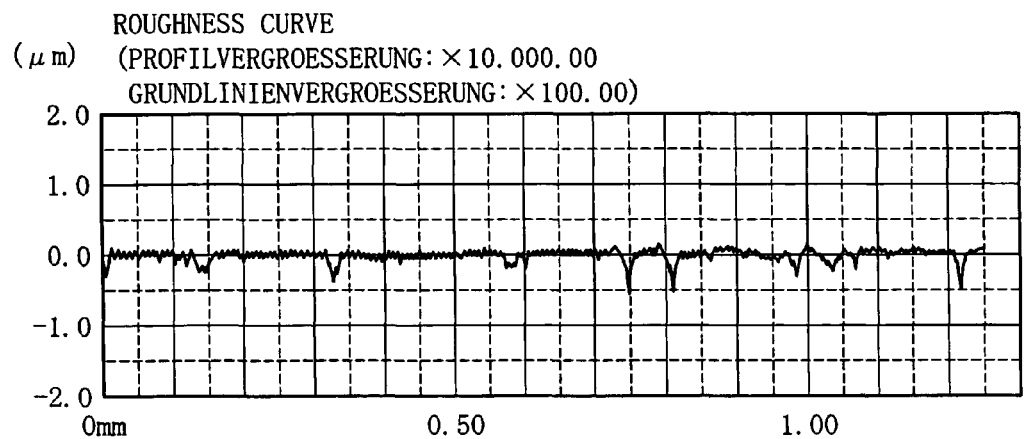
FIG. 5 is a graph of a roughness curve showing a state of a finished surface of a rolling element of a test bearing.

FIG. 1 shows a first example of a rolling bearing. A rolling bearing 1 is a needle roller bearing in which a needle roller 2 is incorporated into an outer race 3, the needle roller 2 serving as a rolling element. The needle roller 2 supports a mating shaft 4. Described below is a result of a life test carried out on produced needle roller bearings of a plurality of types, which have needle roller surfaces treated with surface treatments for providing different finished surfaces. A needle roller bearing used for the life test has an outer diameter Dr of 33 mm, an inner diameter dr of 25 mm, a diameter D of the needle roller 2 of 4 mm, and a length L of the needle roller 2 of 25.8 mm, employs 15 needle rollers, and is provided with a cage 5 as shown in FIG. 2. As test bearings, 3 different types of bearings including needle rollers of which surfaces are finished to have different roughnesses, that is, a bearing A (comparative example) which is subjected to super finishing after grinding, a bearing B (comparative example) having innumerable minute concave recesses randomly formed thereon, and a bearing C (example). States of finished surfaces of the needle rollers of the respective test bearings are shown in FIGS. 3 to 5. In particular, FIG. 3 shows a surface roughness of the bearing A, FIG. 4 shows a surface roughness of the bearing B, and FIG. 5 shows a surface roughness of the bearing C, respectively. Further, a list of characteristic value parameters of the finished surfaces of the test bearings is shown in Table 1. Note that in Table. 1, a parameter Sk indicates a skewness of a surface roughness distribution curve (ISO 4287: 1997), and serves as an index of a sample statistic value for knowing asymmetry of irregularity distribution. When the distribution is symmetric like in Gaussian distribution, the Sk value becomes nearly 0. In a case where convex portions of the irregularities are eliminated, the Sk value becomes a negative value, and in the opposite case, the Sk value becomes a positive value. The Sk value can be controlled by selecting a rotational speed, a working time, a work charging number, kind and size of a chip of the above-mentioned barrel finishing machine, and the like. By setting the Sk value to be equal to or lower than −1.6 in both a width direction and a circumferential direction, the minute concave recesses constitute oil basins. Accordingly, even when compression is effected, there are effects in that leakages of oil in a slide direction and a perpendicular direction are little, oil film formation is excellent, a state of oil film formation is favorable, and a surface damage is suppressed to a minimum. Note that a value of Rqni (L/C) of each of the bearings B and C is equal to or lower than 1.0, and a value Rqni (L/C) of the bearing A is around 1.0.

TABLE 1

| Bearing | Rqni | Sk | Ryni (μm) | Rymax | Area percentage (%) | Average area (μm²) | Rqni (L/C) |
|---|---|---|---|---|---|---|---|
| A (Comparative example) | 0.01 to 0.03 | −0.8 to 0.9 | 0.1 to 0.2 | 0.1 to 0.3 | — | — | — |
| B (Comparative example) | 0.10 to 0.20 | −5.0 to −2.0 | 1.1 to 1.5 | 1.1 to 2.0 | 24 to 40 | 105 to 150 | ≦1.0 |
| C (Example) | 0.05 to 0.09 | −4.9 to −1.6 | 0.4 to 1.0 | 0.4 to 1.0 | 5 to 20 | 30 to 100 | ≦1.0 |

Figure 6:
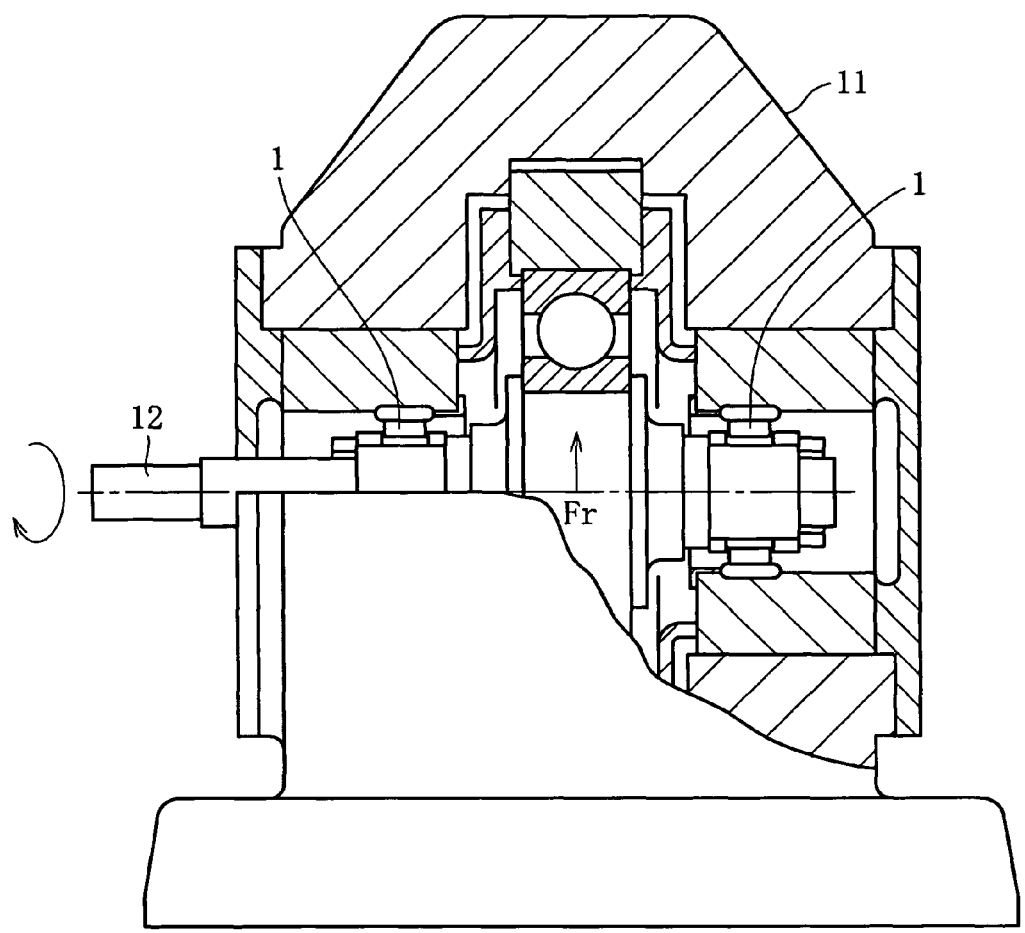
FIG. 6 is a schematic view of a test apparatus.

Used as a test apparatus is a radial load testing machine 11 as schematically shown in FIG. 6, in which test bearings 1 are attached to both sides of a rotating shaft 12, and rotation and a load are applied thereto to perform a test. An inner race (mating shaft) used in the test is finished to have Ra 0.10 to 0.16 μm obtained by polish finishing.

An outer race is finished in the same manner. Test conditions are as follows.
Bearing radial load: 2000 kgf
Rpm: 4000 rpm
Lubricant: Cresec oil H8 (2 cst under the test conditions)

Figure 7:
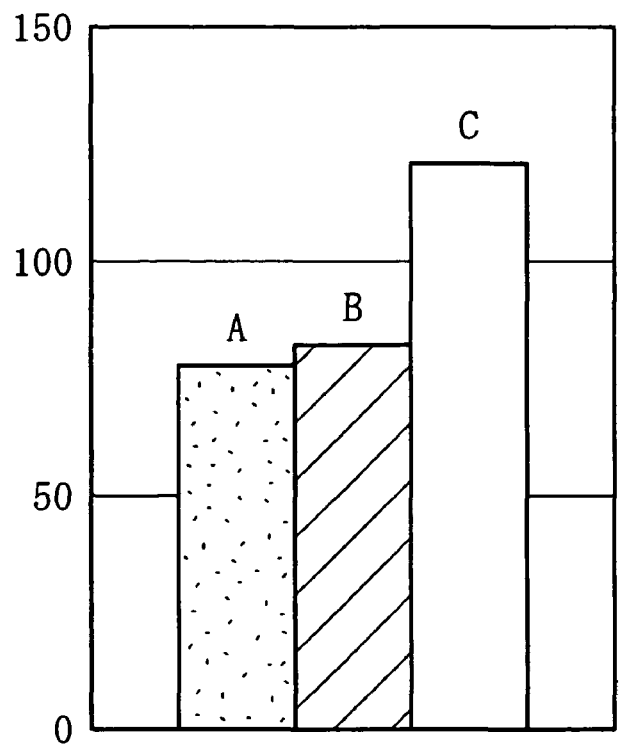
FIG. 7 is a graph showing a result of the life test.

FIG. 7 shows a result of a life test under a condition of an oil film parameter Λ of 0.13. A vertical axis of the figure represents an L10 life (h). As is obvious from the figure, the bearing A has 78 h and the bearing B has 82 h, while the bearing C has 121 h. As shown in this data, the bearing C according to the example can obtain a long life effect even under an extremely severe lubrication condition, that is, low viscous and dilute condition, in which the oil film parameter Λ of 0.13.

recesses may be randomly formed in the large end face 18 as well as in the rolling contact surface 17. In a similar manner, in a case of the inner race 14, the innumerable minute concave recesses may be randomly formed in the inner surface of the cone back face rib 5 as well as in the raceway surface.

Description will be made of life tests carried out on conventional tapered roller bearings A and B including tapered rollers having smooth-finished rolling contact surfaces (comparative examples), bearings C to E including tapered rollers having rolling contact surfaces in which innumerable minute concave recesses are randomly formed (comparative example), and bearings F and G (examples) (refer to Table 2). The bearings A to G used are tapered roller bearings in each of which an outer diameter of an outer race is 81 mm and an inner diameter of an inner race is 45 mm. Note that rolling contact surfaces of rollers of the bearings A and B according to comparative examples are subjected to super finishing after grinding and are not machined to have recesses. Each of rolling contact surfaces of rollers of the bearings C to E according to comparative examples and the bearings F and G according to examples are subjected to special barrel finishing so that innumerable minute concave recesses are randomly formed thereon. Note that Rqni (L/C) of each of the roller bearings C to G is equal to or lower than 1.0 and Rqni (L/C) of each of the roller bearings A and B is around 1.0.

TABLE 2

| Test bearing | | Average area (μm²) | Ryni (μm) | Area percentage (%) | Sk | Rqni (L/C) | Rymax | Life time (h) |
|---|---|---|---|---|---|---|---|---|
| Comparative example | A | — | 0.32 | — | −0.9 | — | 0.5 | 11.5 |
| | B | — | 0.41 | — | −0.7 | — | 0.7 | 9.2 |
| | C | 132 | 1.47 | 25 | −4 | ≦1.0 | 1.9 | 15.5 |
| | D | 113 | 1.12 | 19 | −3.2 | ≦1.0 | 1.2 | 50.5 |
| | E | 30 | 0.32 | 5 | −1.8 | ≦1.0 | 0.5 | 19.8 |
| Example | F | 94 | 0.95 | 17 | −2.6 | ≦1.0 | 1 | 129.6 |
| | G | 52 | 0.52 | 5 | −1.8 | ≦1.0 | 0.6 | Equal to or more than 200 |

Figure 8:
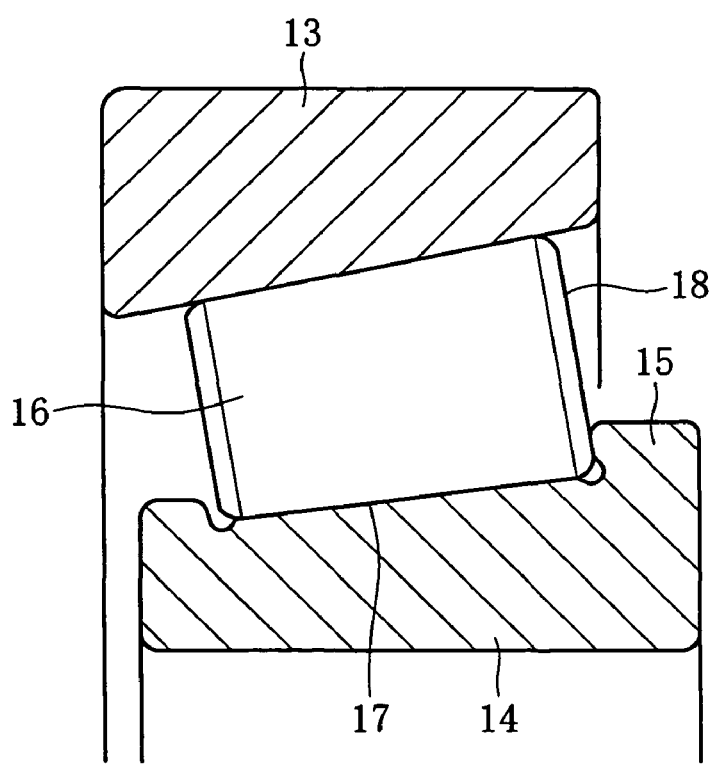
FIG. 8 is a sectional view of a tapered roller bearing.
Figure 10:
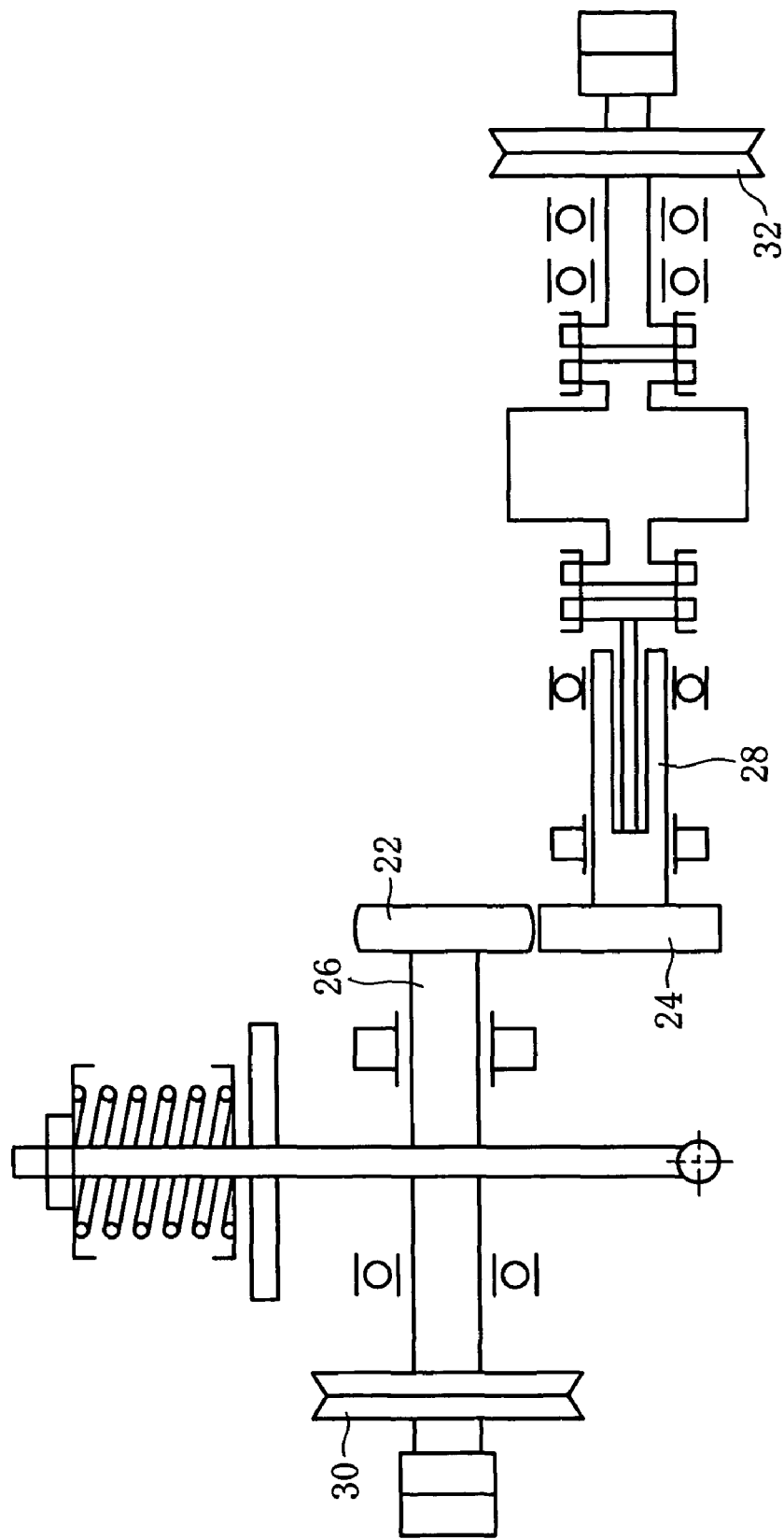
FIG. 10 is an overall schematic diagram of a double cylindrical test apparatus.

Next, FIG. 8 shows a tapered roller bearing as a second exemplary rolling bearing. The tapered roller bearing is a radial bearing using tapered rollers 16 as rolling elements. Between a raceway of an outer race 13 and a raceway of an inner race 14, there are interposed the plurality of tapered rollers 16 in a freely rolling manner. During operation, a rolling contact surface 17 of each of the tapered rollers 16 comes into rolling contact with the raceways of the outer race 13 and the inner race 14, and a large end face 18 of the tapered roller 16 comes into slide contact with an inner surface of a cone back face rib 15 of the inner race 14. Thus, in a case of the tapered roller 16, the innumerable minute concave A double cylinder testing machine as shown in FIG. 10 is used to perform a peeling test to evaluate a metal contact ratio. In the figure, each of a driving-side cylinder 22 (D cylinder: Driver) and a driven-side cylinder 24 (F cylinder: Follower) is attached to one end of respective corresponding cylinders. Two rotating shafts 26 and 28 can be driven by different motors through intermediation of pulleys 30 and 32, respectively. The shaft 26 on the D cylinder 2 side is driven by the motor and the F cylinder is made to freely roll so as to be driven by the D cylinder 22. There are prepared two types of surface processings according to a comparative example and an example of the F cylinder 24. The details including test conditions are represented in Table 3.

TABLE 3

| | | Comparative example | Example |
|---|---|---|---|
| Testing machine | Double cylinder testing machine (refer to FIG. 9) | | |
| Driving-side cylinder (D cylinder) | φ40 × L12, Secondary radius of curvature R60 SUJ2 Standard goods + outer surface super finishing | | |
| Driven-side cylinder (F cylinder) | φ40 × L12, Straight SUJ2 Standard goods + outer surface super finishing | | |
| | Surface treatment | | |
| | Average area (μm²) | 145 | 83 |
| | Ryni (μm) | 1.21 | 0.73 |
| | Area percentage (%) | 20 | 15 |
| Rpm | 2000 rpm | | |
| Load | 2156 N (220 kgf) | | |
| Maximum contact pressure Pmax | 2.3 GPa | | |
| Osculating ellipse (2a × 2b) | 2.34 mm × 0.72 mm | | |
| The number of time(s) of load application | 2.4 × 10⁵ Time(s) (2 h) | | |
| Ambient temperature | Normal temperature | | |
| Refueling method | Refueling with felt pad | | |
| Lubricating oil | JOMO HI SPEED FLUID (VG1.5) | | |

Figure 9A:
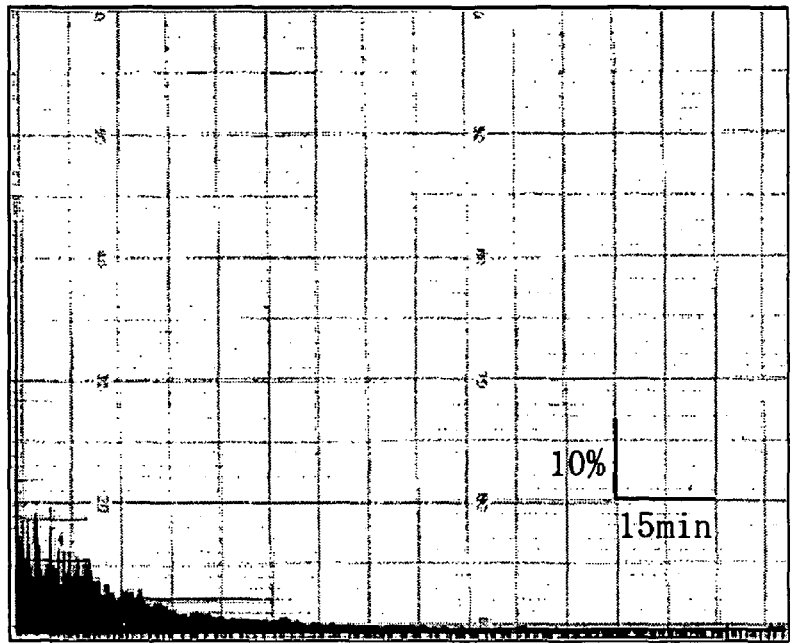
FIG. 9A is a graph showing a metal contact ratio according to an example of the present invention.
Figure 9B:
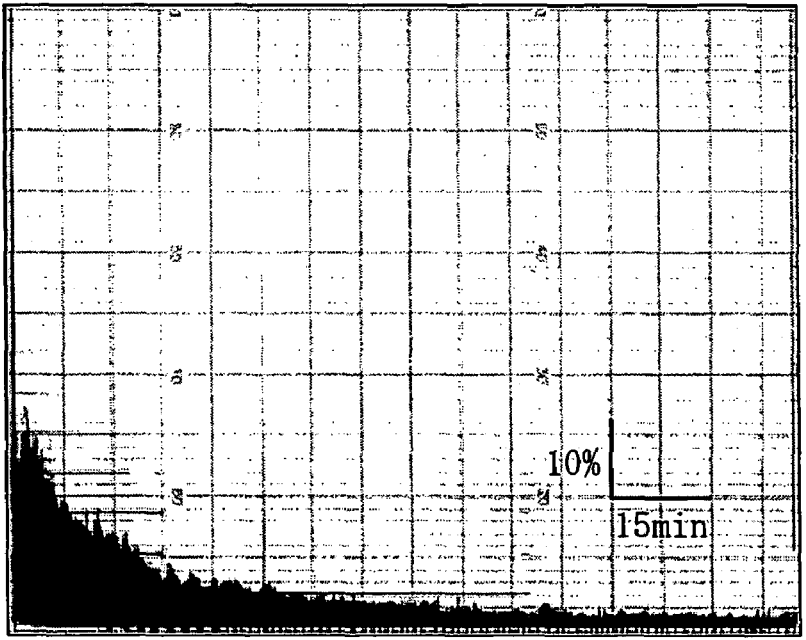
FIG. 9B is a graph showing a metal contact ratio according to a comparative example of the present invention.

Comparative data of the metal contact ratio are shown in FIG. 9. In each of the figures, a horizontal axis indicates an elapsed time and a vertical axis indicates the metal contact ratio. FIG. 9A shows a metal contact ratio of the rolling contact surfaces of the rollers of the bearings according to the examples. FIG. 9B shows a metal contact ratio of the rolling contact surfaces of the rollers of the bearings according to the comparative examples. When comparison is made between those figures, as compared to the comparative examples, in the examples, improvements of the metal contact ratio can be clearly recognized. In other words, an oil film forming ratio (=100%−metal contact ratio) of the bearings according to the examples is higher by 10% at a start of operation and by 2% at an end of the test (2 hours later), than that of the bearings according to the comparative examples.

The invention claimed is:

1. A rolling bearing, comprising:
a rolling element having innumerable minute concave recesses randomly formed at least on a surface thereof, wherein an area percentage of the recesses on the surface having the recesses formed thereon is in a range from 5 to 20%, and a surface roughness parameter Rymax of the surface having the recesses formed thereon such that the depth of the recesses is in the range of 0.4 to 1.0 μm, wherein a roughness parameter Rqni of the surface having the recesses formed thereon is in the range of 0.05 to 0.09 μm, and
wherein, when the surface roughness of the surface having the recesses formed thereon is expressed by the parameter Rqni, a value of a ratio "Rqni(L)/Rqni(C)" between an axial surface roughness Rqni(L) and a circumferential surface roughness Rqni(C) is equal to or lower than 1.0.

* * * * *